Nov. 17, 1959   G. D. GILMORE ET AL   2,912,719
INJECTION MOLDING MACHINE AND CONTROL MECHANISM THEREFOR
Filed Nov. 13, 1956   3 Sheets-Sheet 1
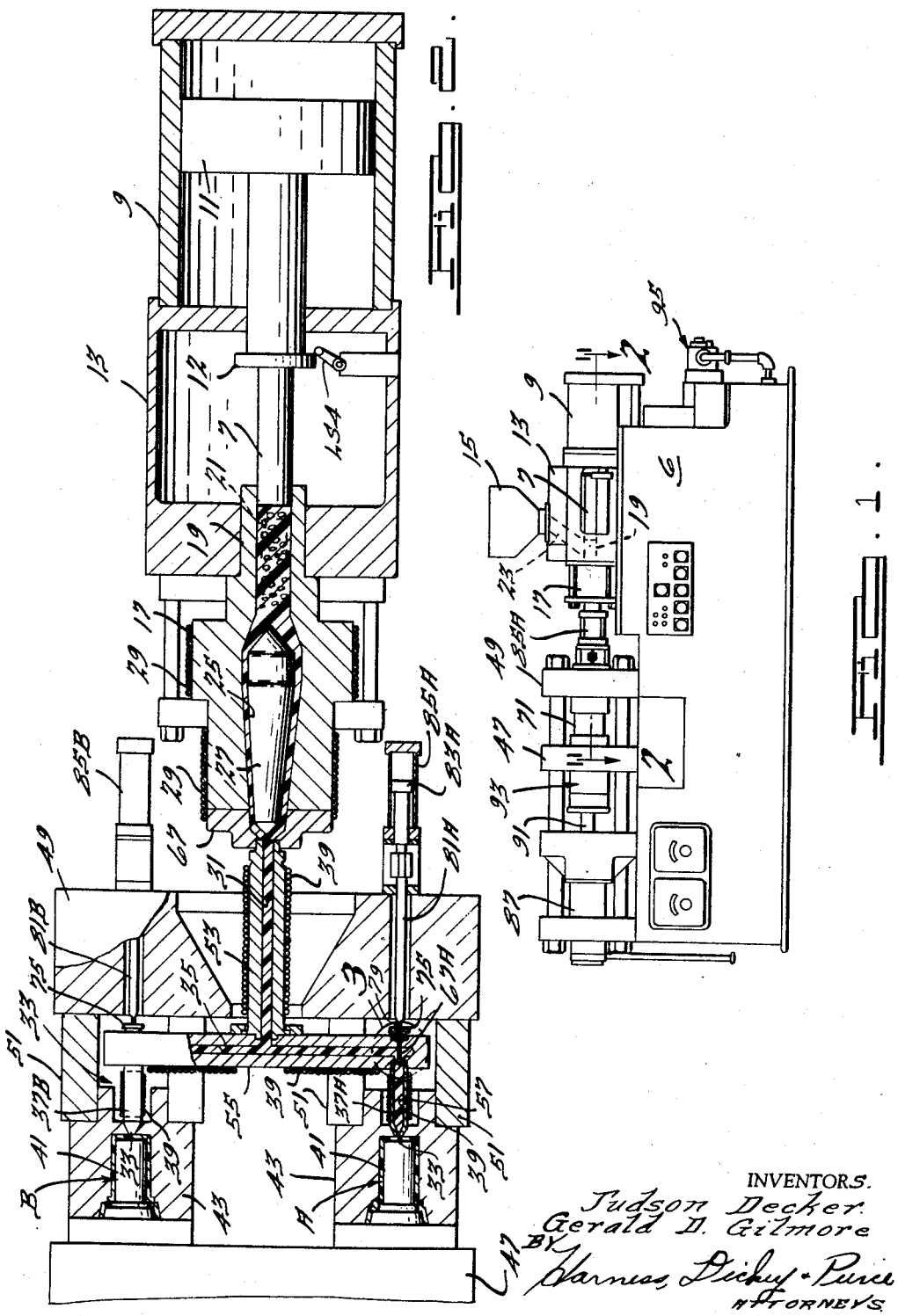
INVENTORS.
Judson Decker
Gerald D. Gilmore
BY Harness, Dickey & Pierce
ATTORNEYS Nov. 17, 1959 G. D. GILMORE ET AL 2,912,719
INJECTION MOLDING MACHINE AND CONTROL MECHANISM THEREFOR
Filed Nov. 13, 1956 3 Sheets-Sheet 2

INVENTORS.
Judson Decher
Gerald D. Gilmore.
BY Harness, Dickey & Pierce
ATTORNEYS.

Nov. 17, 1959 G. D. GILMORE ET AL 2,912,719
INJECTION MOLDING MACHINE AND CONTROL MECHANISM THEREFOR
Filed Nov. 13, 1956 3 Sheets-Sheet 3

INVENTORS.
Judson Decker.
Gerald D. Gilmore.
BY Harness, Dickey & Pierce
ATTORNEYS United States Patent Office 2,912,719
Patented Nov. 17, 1959

2,912,719

INJECTION MOLDING MACHINE AND CONTROL MECHANISM THEREFOR

Gerald D. Gilmore, Rochester, and Judson Decker, Birmingham, Mich., assignors to Bopp-Decker Plastics, Incorporated, Clawson, Mich., a corporation of Michigan Application November 13, 1956, Serial No. 621,842

4 Claims. (Cl. 18—30)

This invention relates to improvements in injection molding machines.

It is conventional in the operation of injection molding machines to inject thermoplastic material under pressure into a single mold cavity or into a plurality of mold cavities simultaneously. Single cavity molding has the disadvantage of low production. Simultaneous molding in multiple cavities increases production but there are attending disadvantages. For example, any given injection molding machine has a maximum rate of injection, and this maximum rate of injection must be divided by the number of mold cavities which are simultaneously filled. Thus the effective rate of material injection into each cavity and therefore the productive potential of any machine with a given capacity is considerably reduced. To compensate for this by increasing the capacity of the machine is not practical in most cases for the reason that it not simply accomplished. In other cases resort to a larger machine is not possible and in still other cases where it is possible it may not be feasible because the increased cost of operation involved with the larger machine may be out of proportion to the advantages achieved. In any case the dies which are affixed to the machine for a production run and which contain the plurality of mold cavities must be balanced so that the injection rate is divided equally between the cavities. Moreover the plurality of mold cavities must be similar in section thickness and shape, i.e. weight of molded article. In addition gates and runners must be balanced which appreciably lengthens mold try-out time.

The instant invention has for its primary objects the elimination of the foregoing deficiencies attendant with the present technique of simultaneous injection molding and the provision of substantial advantages heretofore not realized which will appear as the description thereof proceeds. These and related objects are accomplished in accordance with the present invention by means including combination apparatus for injection molding which considered briefly and in a broad aspect effects injecting plasticized thermoplastic material under pressure into a plurality of mold cavities successively instead of simultaneously and which accomplishes the filling of each cavity by the explosive impact of suddenly released energy.

In the embodiment of apparatus to be described each of a plurality of mold cavities is provided with an orifice at its inlet and with valve means independently controlling each of the orifices. During the filling operation, pressure in the injection system is developed so that it is sufficient to explosively fill individually each mold cavity in succession and it is thus developed for as many cavities as there are to be filled. This requirement can be accomplished by developing the necessary pressure intermittently prior to the filling of each cavity but preferably is accomplished by continuously maintaining, though not necessarily at a constant value, the pressure in the system by the following sequence of operations briefly described. The plurality of cavities are filled successively by first closing off the inlet to all of the cavities and building up the pressure in the injection system through the movement of the injection plunger. At the instant the pressure has reached a predetermined value, the valve means controlling a single cavity is opened releasing the full available energy of the machine to explosively inject the plasticized material into this cavity. During the filling of the first cavity the pressure in the system is maintained by the continued movement of the injection plunger. After the first cavity is filled its orifice is closed by its respective valve means and thereupon the valve means for a second cavity is actuated to open the orifice therefor and the second cavity is filled by the same sudden release of the full available energy of the machine. Remaining cavities, if any, are filled successively in the same manner.

At this point, it is deemed important to digress momentarily to consider the mechanism of simultaneous filling a plurality of mold cavities. In simultaneous filling when the plasticized material starts moving into the mold cavities the pressure in the system is only that sufficient to overcome the resistance in the various passageways. Because the system is open the plasticized material flows into the cavities initially at a relatively slow rate as compared to the rate possible at maximum injection pressure. As the plasticized material begins filling the cavities there occurs a gradual buildup of the pressure in the system with a corresponding increase in the rate of material injection. The maximum rate of material injection which is far below that obtainable from the same machine in accordance with the present invention is not reached until the mold cavities are partially filled. Resistance to filling at this time has increased because of partial solidification of the plasticized material. As the material flows between the walls of each relatively cold mold cavity that portion which contacts the cavity walls cools and solidifies immediately forming two cold layers of plastic between which subsequent material must flow. At the junction with the first-to-form cold layers weld marks or slip planes of weak resistance to stress tend to form. The slower the filling the thicker these cold outside layers of plastic become. This creates additional resistance to filling. The thinner the wall section of the article to be molded the greater is the restricting effect of these cold layers. Because the material will follow the path of least resistance the cavity which is largest will usually be filled first and the cavities which offer greater resistance will fill more slowly, further increasing the resistance to filling. Also, in actual practice the die core is seldom, if ever, exactly concentrically disposed within the die cavity. Accordingly, when plastic material is injected initially relatively slowly into such a cavity, it follows the path of least resistance and tends to flow to and to build up more rapidly in the larger side of the cavity. This condition creates an unbalanced lateral pressure against the core which forces it farther into the narrow portion of the cavity and increases the variation in wall thickness of the article produced by the die. The thinnest section of the wall is thus considerably weaker than otherwise would be the case and the result is an inferior product. We have found that these defects in the prior art are largely overcome by injecting the plastic material into the mold cavity initially at the maximum pressure of which the injection system is capable. Under these conditions the plastic material is exploded into the mold cavity and as a result the entire filling operation takes place in a fraction of the time heretofore required and the plastic apparently fills the cavity more or less uniformly regardless of slight initial eccentricities of the die parts.

The features of construction and principles of operation of the invention which will be more particularly set forth hereinafter when considered in their entirety afford advantages which are legion and among which the more prominent are:

(1) The maximum rate of injection of a given machine is available for filling each mold cavity.

(2) Actual filling of the mold cavities takes place in a fraction of the time required for simultaneous filling as hereinabove described.

(3) Because the system is closed prior to the filling of all of the cavities and immediately after the filling of each cavity back flow is eliminated and the need for packing is dispensed with.

(4) Molding conditions can be closely controlled in each cavity independently of other cavities.

(5) Orientational strains from cold layers in the finished article are prominently absent because of the rapid speed of filling.

(6) Increased strength and more uniform wall thickness of articles result as the tendency for die shifting is minimized.

(7) Cavity balance is no longer critical to the successful operation of a given production run.

(8) Thinner and more intricate articles can be molded singly or in groups with comparative simplicity.

(9) Gate and runner balancing is no longer required and mold try-out time is appreciably reduced.

(10) Because of rapid controlled filling, the clamp requirements on any one machine are lessened.

(11) The productive capacity of a given machine can be at least doubled or trebled because of more rapid filling of the mold cavities and individual control of the filling of each.

(12) Greater latitude is available in molding articles of dissimilar shapes, weights and section thicknesses in the same production run.

(13) The means of the invention can be readily adapted to existing equipment.

The above and related objects and advantages of the invention will become apparent during the course of the following description taken in conjunction with the accompanying drawings.

In the drawings:

Figure 1 is a side elevational view of an injection molding machine embodying the invention;

Figure 2 is an enlarged fragmentary, horizontal sectional view with parts in elevation taken on the line 2—2 of Figure 1;

Figure 5 is a schematic diagram of the electrical system thereof.

Figure 3:
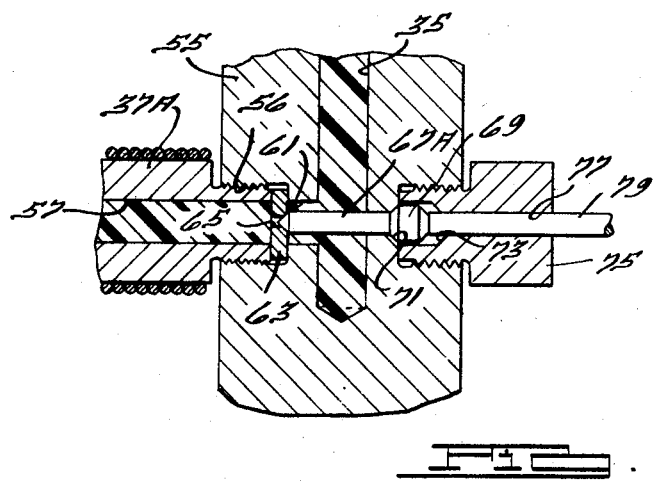
Figure 3 is an enlarged view of the portion of Figure 2 enclosed in the circle 3.

Referring now to the embodiment of the invention shown in the drawings and particularly to Figures 1–3, the novel means of the present invention is shown therein in combination with a conventional injection molding machine. The injection molding machine includes among other structures a base 6 upon which is mounted an axially movable ram or injection plunger 7, a power cylinder 9 therefor and a piston 11 movable in the cylinder 9. The plunger 7 extends into an open mounting structure 13 which carries a hopper 15 for receiving thermoplastic material. The thermoplastic material can be any of the types which are well known in the art and is fed to the hopper 15 in comminuted or granular form usually as small particles of rod-like shape. The plunger 7 is connected to the piston 11 by a rod having a radial flange 12 which engages a limit switch LS4 for purposes hereinafter described. A heating cylinder 17 disposed forwardly of and removably affixed to the structure 13 is provided with a hollow extension 19 in which the plunger 7 operates. The extension 19 has formed therein an opening 21 by which it receives the plastic material from the hopper 15 through a chute 23.

The main body of the heater 17 defines a heating chamber 25 in which is disposed as is conventional a torpedo or spreader 27. Heat can be supplied to the heater 17 for plasticizing the granular thermoplastic material as it is forced ahead of the plunger 7 in any of the ways well known in this art as for example by heater bands 29 as shown. The injection system for the plasticized material begins at the heater 17 and terminates at the mold cavities and in the embodiment shown includes a main passageway 31, a gate 33 for each mold cavity and a pressure manifold 35 which commonly feeds the plurality of gates 33.

In the embodiment being described only a pair of mold cavities are shown which are disposed parallel to each other and with their axes in a common horizontal plane. It should be apparent however that more than two mold cavities may be employed and that they may be disposed radially or in any other way. For convenience of description the two mold cavities shown will be designated A and B. The gates 33 in the instance shown are formed in nozzles 37A, 37B of which more will be said later. The plasticized material in the injection system is maintained in a flowable condition by heater bands 39 suitably located as shown.

The mold cavities A and B as is well known are defined by mating male and female dies indicated at 41 and 43, respectively. The male dies 41 are carried by a movable platen 47 and the female dies 43 are affixed to a stationary platen 49 through mounting members 51. The main passageway 31 is formed in a cylindrical heater extension 53 which extends through the stationary platen 49 and is supported at one of its ends by the heater 17. The other end of the heater extension 53 is connected to a transversely disposed nozzle bar 55. The common runner 35 is defined by the passageway formed in the nozzle bar 55 as shown. The opposite ends of the nozzle bar 55 extend into the members 51 and inwardly of the opposite ends of the nozzle bar 55 are affixed the pair of nozzles 37A, 37B which communicate respectively with mold cavities A and B.

For this purpose the nozzle bar 55 is provided with a pair of threaded openings only one of which is shown and indicated at 56 in Figure 3. The opening 56 receives the threaded stud end on the rear of the nozzle 37A as shown. Each of the nozzles 37A and 37B is provided with a central opening 57 which terminates at its forward end in one of the gates 33 which leads directly to its respective mold cavity. Since the nozzles 37A and 37B are identical a description of one will suffice for the other and the nozzle 37A corresponding to mold cavity A shown in the enlarged view of Figure 3 will be described.

Figure 4:
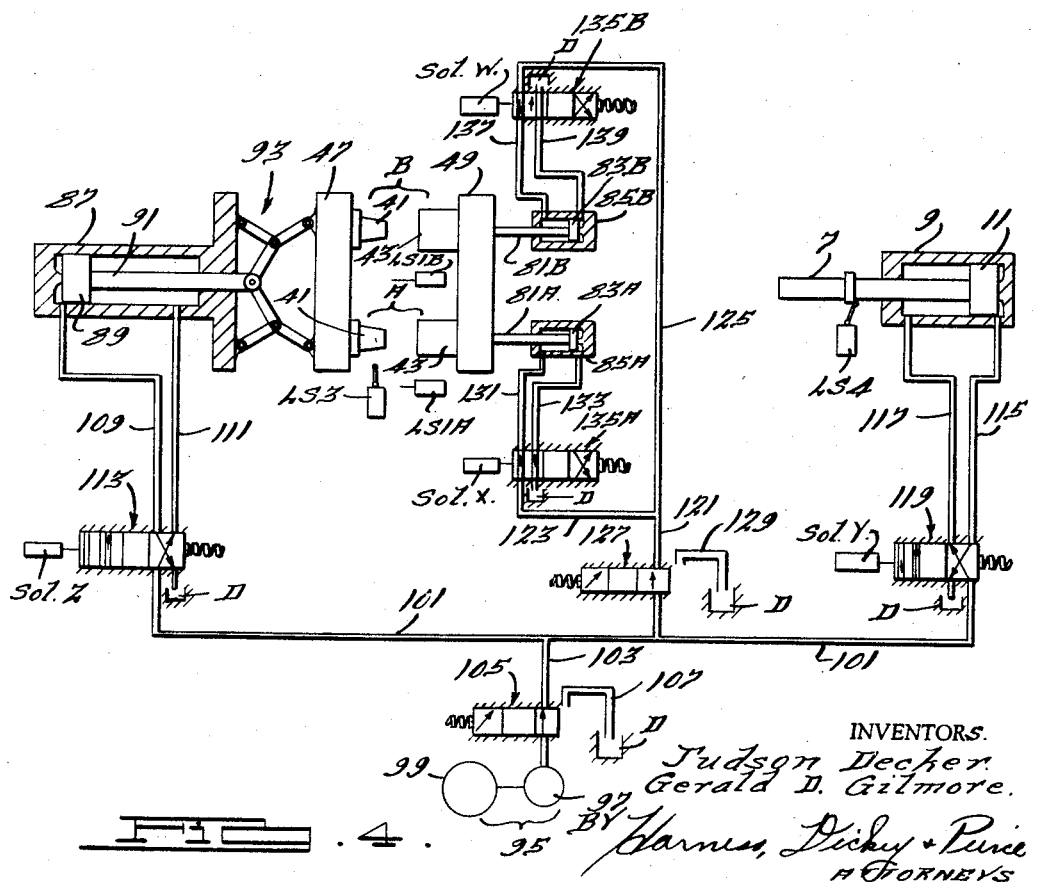
Figure 4 is a diagrammatic view showing the hydraulic system of the machine.
Figure 3:
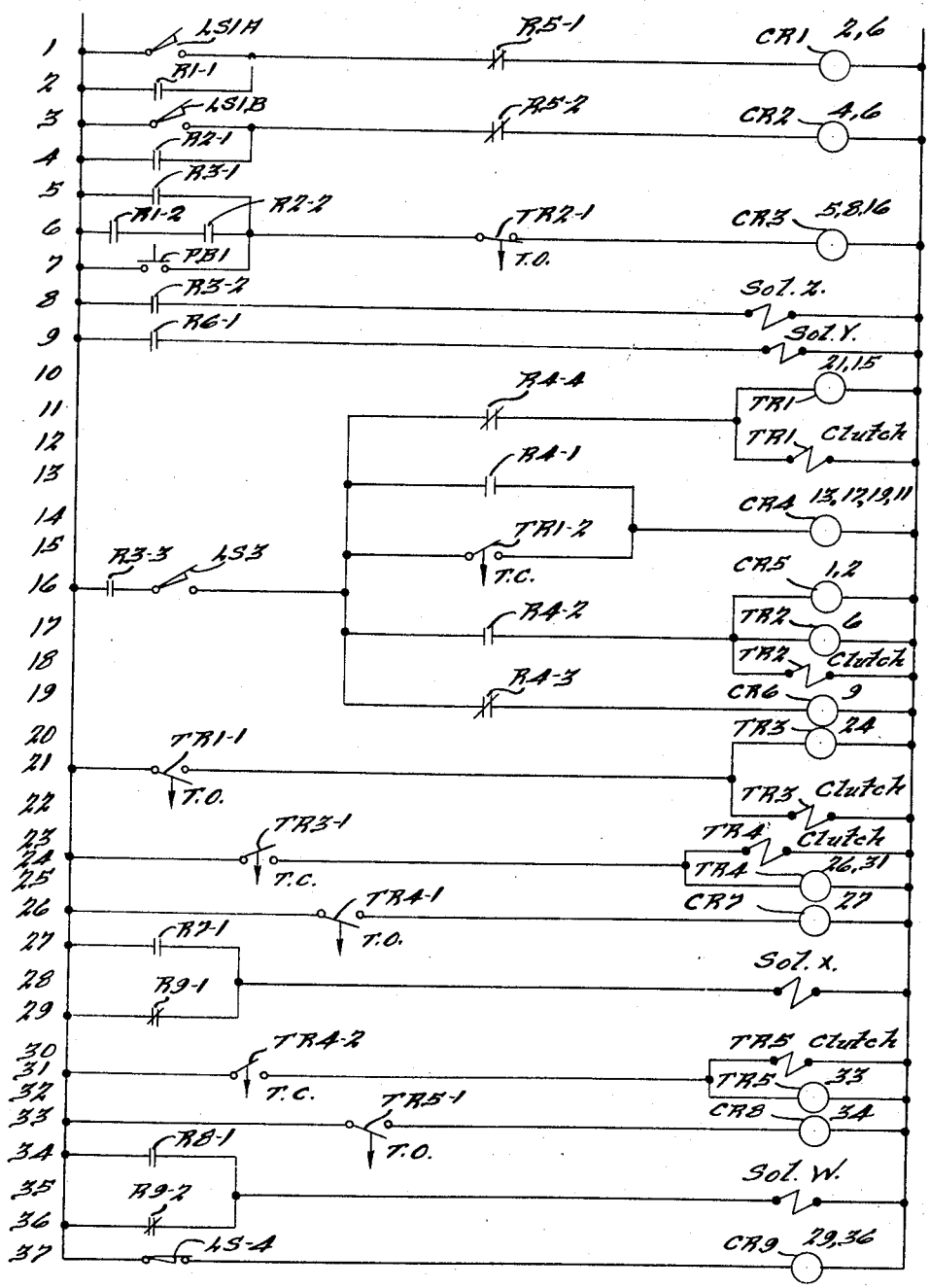

The central opening 57 in the nozzle 37A communicates with the manifold 35 through an aperture 61 (Figure 3) which is formed in the nozzle bar 55 behind the threaded opening 56 therein. Interposed between the aperture 61 and the nozzle 37A is a fitting 63 in which is formed an orifice 65. Flow through the orifice 65 is controlled by a valve 67A one end of which is tapered as shown and seats within the orifice 65. The other end of the valve 67A is provided with a radially enlarged portion 69 the forward and rearward ends of which are tapered as shown to seat respectively against a tapered seat 71 formed in the nozzle bar 55 and a tapered seat 73 formed in a member 75 which is threadably secured to the nozzle bar 55 as shown. The member 75 has formed therein, rearwardly of its tapered seat 73, an axial aperture 77 which slidably carries a connector 79 which joins the valve 67A to a valve rod 81A. The corresponding valve rod for the mold cavity B is shown in Figure 2 and designated 81B. The valve rod 81B is secured to a valve (not shown) which is identical to valve 67A and will be hereinafter referred to as valve 67B for clarity of description. The valve 67B controls the orifice not shown at the inlet of the nozzle 37B. The valve rods 81A and 81B are actuated by pistons 83A and 83B respectively to which they are joined as shown (Figure 4). The pistons 83A and 83B operate within valve power cylinders 85A and 85B respectively.

The pistons of the several power cylinders previously mentioned are actuated by the combination apparatus shown in Figure 4 together with the hydraulic system therefor but before passing to the description of this structure, it should be noted that a clamp operating cylinder 87 as is conventional is mounted on the base 6 of the injection molding machine as shown in Figure 1 forwardly of the movable platen 47. A piston 89 (Figure 4) is movable within the cylinder 87 and through its rod 91 and a clamping mechanism indicated generally at 93 is connected to the movable platen 47 for actuating the same between the limits of its travel toward and away from the stationary platen 49. When the platen 47 is actuated to its extreme extended position with the male dies 41 properly mated with the female dies 43 to form the mold cavities A and B it is locked in this position by the dead center action of the toggle linkage as shown in Figure 4 which constitutes the clamping mechanism 93.

In operation of the apparatus described to this point with the movable platen 47 locked in position, when the injection plunger 7 is actuated it forces the granular thermoplastic material from the hopper 15 into the heater 17 where the material becomes plasticized and flow around the spreader 27 through the main passageway 31 into the manifold 35. As has been mentioned the orifices controlling the mold cavities A and B are closed by the valves 67A and 67B at the commencement of the filling operation, the valves having been actuated to this position in response to the initial movement of the plunger 7. The pressure in the closed injection system builds up rapidly and early in the movement of the plunger. With the valves 67A and 67B in their closed position the taper on the front end of each of the enlargements 69 thereon seat against their respective seats 71 in the nozzle bar 55 and seal the plasticized material under pressure in the manifold 35.

When the pressure in the injection system reaches a maximum corresponding to a predetermined time of movement of the plunger 7, one of the valves for the mold cavities is actuated to open position and the other is maintained closed. In order to secure the advantages listed above and attributable to explosive filling of the mold cavity it is necessary to build up a pressure of at least 8,000–10,000 pounds per square inch at the discharge end of the system before the valve is opened to admit plastic material into the cavity. Considerably higher pressure can be used to advantage in many instances. In a typical system such as the one here shown, this may require a pressure of from 15,000 to 20,000 pounds per square inch at the ram face. Pressures of this magnitude cause the plastic material to flow into the mold cavity when the valve is popped open at a rate of from 20 to 30 cubic inches per second and assure the "explosive" filling action which achieves the benefits of this invention. It will be assumed that valve 67A is thus actuated. At the instant the valve 67A opens the full available energy of the machine is released and cavity A is explosively filled with plasticized material at the maximum injection rate. During this filling of cavity A the pressure is maintained in the injection system by the continued movement of the plunger 7. Opening of the valve 67A causes the taper on the rear of the enlargement 69 thereon to seat against the tapered seat 73 in the member 75 and prevents the escape of plasticized material rearwardly of the enlargement 69. The valve 67A is maintained open for a time sufficient to permit the filling of the cavity A and it is then closed to seat against the orifice 65 and locks the pressure in the cavity A. Also leakage of plastic from the manifold 35 is prevented by the seating of the enlargement 69 against the seat 71. As the orifice to the cavity A is closed by the valve 67A, the valve 67B is actuated to open position. Since the pressure in the system is continually maintained, cavity B is filled with the same sudden release of the full available energy of the machine. At a predetermined time following the opening of the valve 67B it is actuated to closed position and locks the pressure in cavity B.

Upon completion of the filling of cavity B the plunger 7 returns to its rearward position and the material in the mold cavities cools. Before the mold cavities are opened both of the valves 67A and 67B are actuated to open their respective orifices to relieve the pressure in the nozzles 37A, 37B respectively. If the orifices 65 were arranged to open directly into the mold cavity the valves need not be opened before the dies are parted. Upon return of the injection plunger to its retracted position the mold cavities are opened and the finished articles ejected therefrom. It should be apparent that an arrangement may be employed wherein more than one mold cavity is controlled by a single valve and that the benefits of explosive filling may nevertheless still be realized.

Referring now to the combination apparatus and to the hydraulic system therefor shown in Figure 4 the fluid pressure for the latter is developed by a pump and motor unit indicated generally at 95 which comprises a pump 97 driven by a motor 99. The pump and motor unit 95 may be conveniently mounted on the base 6 of the injection molding machine at one end thereof as shown in Figure 1. The pump 97 feeds pressure fluid to the header 101 through the main hydraulic line 103. The pressure of the hydraulic system is controlled by a spring biased pressure control valve 105 connected in the main line 103. The two positions of the pressure control valve 105 are diagrammatically depicted in block diagram. When the pressure developed by the pump 97 exceeds a predetermined maximum value the valve 105 is shifted from its normal position as shown to direct pressure fluid through the by-pass hydraulic line 107 to drain or the return side of the pump 97 which is indicated throughout Figure 4 by the letter D. The setting on the control valve 105 controls the maximum pressure in the injection system.

The clamp operating cylinder 87 is connected between the header 101 and drain D by a pair of hydraulic lines 109, 111 as shown. The direction of flow through the lines 109, 111 is controlled by a solenoid actuated spring biased clamp four-way valve 113. The solenoid for the clamp four-way valve 113 is designated Z. The two positions of the clamp four-way valve 113 are indicated in block diagram. The clamp four-way valve 113 is maintained in the position as shown by its spring and when in this position pressure fluid is directed to the rod side of the piston 89 by the line 111 and the fluid that is displaced on the piston side of the piston 89 returns to drain D by the line 109. In the other position of the clamp four-way valve 113 flow of pressure fluid to the clamp operating cylinder 87 is reversed.

The power cylinder 9 for the injection plunger 7 is similarly connected between the header 101 and drain D by a pair of hydraulic lines 115, 117. For controlling the direction of flow through the lines 115, 117 a spring biased injection plunger four-way valve indicated at 119 is provided which is identical in construction and operation to that of the four-way valve 113. The solenoid for actuating the injection plunger four-way valve 119 is indicated by the letter Y.

A common inlet hydraulic line 121 connects the header 101 to branch hydraulic lines 123, 125 and the pressure in line 121 is controlled by the pressure control valve 127. The pressure control valve 127 operates to direct pressure fluid to drain D through a by-pass line 129 when the pressure in the line 121 exceeds a pre-selected value which is set to overcome the plastic pressure working against the tapered ends of each of the valves 67A and 67B when they are being seated. The power cylinder 85A is connected between the branch line 123 and drain, D by a pair of hydraulic lines 131, 133, the direction of flow through which is controlled by a spring biased four-way valve 135A. The four-way valve 135A is of the same character of construction as the four-way valves 113, 119 previously described except that it is maintained in its normal position as shown by its normally energized solenoid which is indicated by the letter X. The power cylinder 85B is similarly connected between the branch line 125 and drain D by a pair of hydraulic lines 137, 139 and the spring biased four-way valve controlling the direction of flow therethrough indicated at 135B. The solenoid for the four-way valve 135B is designated by the letter W.

In Figure 4 there is also shown in addition to the limit switch LS4 already mentioned a limit switch LS3 and a pair of limit switches LS1A and LS1B. The limit switch LS3 is tripped by the movable platen 47 when it is actuated to its locked position and the pair of limit switches LS1A and LS1B are actuated by finished articles as they are ejected from the mold cavities A and B respectively as will be described.

The electrical system for the various solenoid valves and limit switches controlling the operation of the combination apparatus of Figure 4 is shown in the schematic diagram in Figure 5 with all of the elements thereon designated as shown.

The combination apparatus of Figure 4 is placed in operation by actuation of push button PB–1 (line 7, Figure 5) which momentarily connects its open terminals energizing control relay CR3 (line 6, Figure 5) whereupon the contacts R3–1 close maintaining the control relay CR3 energized and simultaneously contacts R3–2 close energizing solenoid Z. Contacts R3–3 also close. Energization of solenoid Z shifts the clamp four-way valve 113 to direct pressure fluid from the header 101 to the piston side of the piston 89 to actuate the movable platen 47. At the limit of travel of the movable platen 47 when it is locked in position with its dies 41 properly mated with the dies 43 on the stationary platen 49 it actuates the limit switch LS3 to closed position. Closing of the limit switch LS3 energizes timer TR1 (line 10, Figure 5) and control relay CR6 (line 19, Figure 5), normally open contacts R3–3 having been previously closed as mentioned. Timer TR1 (line 10, Figure 5) starts timing and immediately its timed opening contacts TR1–1 close. Closing of contacts TR1–1 starts timer TR3 (line 20, Figure 5) timing. Contacts R6–1 also close energizing solenoid Y which shifts the injection plunger four-way valve 119 to direct pressure fluid from the header 101 to the piston side of piston 11 to actuate the injection plunger 7.

As the injection plunger 7 moves forward a charge of granular thermoplastic material is urged into the heater 17 ahead of the plunger 7 and simultaneously the limit switch LS4 is operated. Actuation of the limit switch LS4 de-energizes control relay CR9 (line 37, Figure 5) whereupon contacts R9–1 and R9–2 open to de-energize the solenoids X and W. The four-way valves 135A and 135B are then shifted by their springs to direct pressure fluid from the hydraulic line 121 to the piston sides of the pistons 83A and 83B respectively. The valves 67A and 67B are thus actuated to close off the orifices at the inlet to the mold cavities A and B respectively.

The pressure in the closed injection system builds up rapidly as the injection plunger moves forward and during this time timers TR1 and TR3 are continuing to time. The timer TR3 is adjusted to time out when the hydraulic system has created the maximum pressure in the injection system. When timer TR3 times out its timed closing contacts TR3–1 close energizing timer TR4 (line 25, Figure 5) which starts timing and at the same time the latter's timed opening contacts TR4–1 close. Closing of the contacts TR4–1 energizes control relay CR7 (line 26, Figure 5) which closes its normally open contacts R7–1 in series with the solenoid valve X and the latter is thereby energized. The four-way valve 135A is shifted by the solenoid X to reverse the direction of flow of pressure fluid to the valve power cylinder 85A so as to actuate the valve 67A and open the orifice at the inlet to the mold cavity A which is forcefully filled in the manner previously described.

The time that the valve 67A remains open is controlled by the timer TR4 which is adjusted to time out substantially contemporaneously with the filling of cavity A. During the filling of cavity A timer TR1 remains timing and the plunger 7 continues its forward movement. When the filling of cavity A is completed timer TR4 times out and its timed opening contacts TR4–1 open de-energizing the control relay CR7 and the contacts R7–1 open de-energizing solenoid X. Upon de-energization of the solenoid X the four-way valve 135A is shifted by its spring and pressure fluid is directed to the piston side of the piston 83A to close the valve 65A. At the same time timed closing contacts TR4–2 close energizing timer TR5 (line 32, Figure 5). Contacts TR5–1 immediately close energizing control relay CR8 (line 33, Figure 5) and its contacts R8–1 close energizing solenoid W to shift the four-way valve 135B. Pressure fluid is then directed to the rod side of piston 83B to actuate the valve 65B opening the orifice at the inlet to the mold cavity B. Mold cavity B is explosively filled with the plasticized material as previously described and during the filling of cavity B timer TR1 remains timing and the plunger 7 continues its forward movement. The time that the valve 67B remains open is controlled by the timer relay TR5 which is arranged to time out at the completion of the filling of cavity B. When cavity B is filled timer TR5 times out and its timed opening contacts TR5–1 open de-energizing the control relay CR8. Contacts R8–1 then open and the solenoid W is de-energized. Upon de-energization of solenoid W the four-way valve 135B is shifted by its spring to reverse the flow of pressure fluid to the valve power cylinder 85B thereby closing the valve 65B to lock the pressure in the mold cavity B.

After the filling operation is completed the timer relay TR1 times out and its timed opening contacts TR1–1 open de-energizing the timer TR3 which is reset by the mechanism of TR3 solenoid clutch (line 22, Figure 5) connected in paralled with the timer TR3. The timer TR3 is thus readied to repeat its function in the next cycle. De-energization of the timer TR3 opens its contacts TR3–1 which de-energizes timer TR4 and the latter is similarly reset by its TR4 solenoid clutch (line 23, Figure 5). Contacts TR4–2 then open de-energizing the timer TR5 and the latter is reset by its TR5 solenoid clutch (line 30, Figure 5). Timed closing contacts TR1–2 close upon the timing out of the timer TR1 and control relay CR4 (line 14, Figure 5) is energized and normally open contacts R4–1 close maintaining the relay CR4 energized. At the same time normally closed contacts R4–4 open which de-energizes the timer TR1 and the latter is reset for the next cycle by its TR1 solenoid clutch (line 12, Figure 5). Normally open contacts R4–2 also close upon the energization of the control relay CR4 and control relay CR5 (line 16, Figure 5) and timer TR2 (line 17, Figure 5) are energized.

The timer TR2 starts timing and normally closed contacts R5–1 and R5–2 open de-energizing control relays CR1 (line 1, Figure 5) and CR2 (line 3, Figure 5) respectively. The opening of the contacts R5–1 and R5–2 is for the purpose of setting up portions of the circuit as will be described so that the cycles of operation of the machine can be repetitively automatic wherein each cycle of operation is started when finished articles ejected from the mold activities A and B trip both of the limit switches LS1A and LS1B. The control relay CR1 and CR2 energized from a previous cycle in this way must be de-energized as by the contacts R5–1 and R5–2, to be set up for enabling the limit switches LS1A and LS1B to start the subsequent cycle.

Energization of the control relay CR4 by the timing out of timer TR1 also opens the normally closed contacts R4–3 which in turn de-energize the control relay CR6 and contacts R6–1 open de-energizing the solenoid Y. Four-way valve 119 then shifts by its spring and pressure fluid and is directed to the rod side of the piston 11 to retract the injection plunger 7. During the rearward movement of the injection plunger 7 the material in the mold cavities sets up and the pressure in the injection system reduces substantially to zero pressure upon return of the injection plunger. At this point the limit switch LS4 is actuated to close position energizing the control relay CR9 and contacts R9–1 and R9–2 close energizing solenoids X and W respectively. Four-way valves 135A and 135B are shifted to reverse the flow of presure fluid to the valve power cylinders 85A and 85B and open the valves 67A and 67B, respectively. Opening of the valves 67A and 67B at this time relieves the pressure in the nozzles 37A and 37B respectively.

The timer TR2 is adjusted to time out in accordance with the cooling time required and when it does its timed opening contacts TR2–1 open and de-energize the control relay CR3. The control relay CR3 is thus set up for the next cycle and its contacts R3–2 open de-energizing solenoid Z. The four-way valve 113 then shifts by its spring to reverse the direction of flow of pressure fluid to the clamp operating cylinder 87 so as to retract the movable platen 47 and open the dies. Retraction of the movable platen 47 opens the limit switch LS3. Previously contacts R3–3 had opened upon de-energization of the control relay CR3. At that time the control relays CR4 and CR5 were deenergized. Upon de-energization of the control relay CR4 its contacts R4–2 open de-energizing the timer TR2 and the latter is reset by its TR2 solenoid clutch (line 18, Figure 5). Upon de-energization of the control relay CR5 its contacts R5–1 and R5–2 close to set up the circuit to permit the cycle of operation to be started by the limit switches LS1A and LS1B as described. The finished articles are ejected from the mold cavities A and B by means not shown and as they depart therefrom they actuate the limit switches LS1A and LS1B energizing the control relays CR1 and CR2 respectively and their corresponding holding contacts R1–1 and R2–1 close. Contacts R1–2 and R2–2 also close energizing the control relay CR3 to repeat the above cycle of operation.

What is claimed is:

1. An injection molding machine for thermoplastic resin material adapted to mount die parts providing a mold cavity and having a cylinder for initially receiving the resin material; a nozzle for delivering resin material to said cavity; a passage connecting said cylinder and said nozzle adapted to receive resin from said cylinder and to deliver it to said nozzle; means for heating said resin to facilitate flow thereof through said cylinder, passage and nozzle; a valve at the juncture of said passage and said nozzle for controlling flow of the resin into said cavity, a ram mounted for reciprocation in said cylinder operative to impose an essentially high pressure on the resin material; and control mechanism for said machine operative to advance said ram initially while maintaining said valve closed whereby to build up said essentially high pressure in the resin between the ram and said valve and then after said pressure has been attained to open said valve so that said resin is exploded into said cavity, said control mechanism being further operative to maintain pressure on said resin by continued advancement of the ram in said cylinder during filling of the cavity, and including means for holding said valve open for a definite interval of time slightly in excess of the time required to fill the cavity during advancement of said ram, means for closing said valve immediately upon expiration of said interval of time, said nozzle providing a storage chamber for supplying resin to the cavity to compensate for shrinkage due to cooling of the resin material in the cavity after the valve is closed, and means for retracting said ram and opening said valve to relieve pressure in the chamber of said nozzle before the mold is opened to eject a molded article from said mold cavity.

2. An injection molding machine for thermoplastic resin material adapted to mount die parts providing a mold cavity and having a cylinder for initially receiving the resin material; a nozzle for delivering resin material to said cavity; a passage connecting said cylinder and said nozzle adapted to receive resin from said cylinder and to deliver it to said nozzle; means for heating said resin material to facilitate flow thereof through said cylinder, passage and nozzle; a valve at the juncture of said passage and said nozzle for controlling flow of resin into said cavity; a ram mounted for reciprocation in said cylinder operative to impose an essentially high pressure on the resin material; and control mechanism for said machine operative to advance said ram initially while maintaining said valve closed whereby to build up said essentially high pressure in the resin between the ram and said valve and then after said pressure has been attained to open said valve so that said resin is exploded into said cavity, said control mechanism being further operative to maintain pressure on said resin by continued advancement of the ram in said cylinder during filling of the cavity and including means for holding said valve open for a definite interval of time slightly in excess of the time required to fill the cavity during advancement of said ram, means for closing said valve immediately upon expiration of said interval of time, said nozzle providing a storage chamber for supplying resin to the cavity to compensate for shrinkage due to cooling of the resin material in the cavity after the valve is closed, and means rendered operative after said valve is closed for sequentially first retracting said ram and then after pressure in the passage has been relieved by retraction of the ram opening said valve to relieve pressure in said nozzle before the die is opened to remove the molded article from said cavity.

3. An injection molding machine for thermoplastic resin material adapted to mount a plurality of dies providing a plurality of mold cavities and having a cylinder for initially receiving the resin material; nozzles associated with respective dies for delivering resin material to said mold cavities; passage means connecting said cylinder and said nozzles adapted to receive resin from the cylinder and to deliver it to said nozzles; means for heating said resin to facilitate flow thereof through said cylinder, passage means and nozzles; valves associated with respective nozzles each located at the juncture of its respective nozzle and said passage means and controlling flow of resin material through such nozzle and into the mold cavity associated therewith; a ram mounted for reciprocation in said cylinder operative to impose an essentially high pressure on said resin material; and control mechanism for said machine operative to advance said ram while maintaining all of said valves closed whereby to build up said essentially high pressure in the resin between the ram and said valves, said mechanism including timer means operative in response to advancement of said ram to open said valves individually and successively and to hold each valve open for a definite interval of time slightly longer than the time required to fill the cavity associated with such valve, said timer means being further operative to close each valve at the end of its time interval and during advancement of said ram, means for retracting said ram after all of said valves have been successively opened and closed to relieve pressure on the resin material in said cylinder and in said passage means behind said valves, said nozzles providing storage chambers for supplying resin to their associated mold cavities after said valves have been closed to compensate for shrinkage due to cooling of the resin material in the cavities, and means for opening said valves to relieve pressure on the resin material in said nozzles after pressure on the main body of said resin material has been reduced by retraction of said ram.

4. An injection molding machine for thermoplastic resin material adapted to mount a plurality of dies providing a plurality of mold cavities and having a cylinder for initially receiving the resin material; nozzles associated with respective dies for delivering resin material to said mold cavities; passage means connecting said cylinder and said nozzles adapted to receive resin from the cylinder and to deliver it to said nozzles; means for heating said resin to facilitate flow thereof through said cylinder, passage means and nozzles; valves associated with respective nozzles each located at the juncture of its respective nozzle and said passage means and controlling flow of resin material through said nozzle and into the mold cavity associated therewith; a ram mounted for reciprocation in said cylinder operative to impose an essentially high pressure on the resin material; and control mechanism for operating said ram and said valves in predetermined timed relationship, said mechanism including means for holding said valves normally closed, means for advancing said ram while said valves are closed to compress resin material in the machine between said ram and said valves, a plurality of timer means each associated with a respective valve and rendered operative by advancement of said ram to open and close their respective valves at different times during advancement of the ram, each timer means being operative to hold its respective valve open for a definite interval of time longer than the time required to fill the cavity with which such valve is associated and to close such valve immediately upon the expiration of said interval of time, said nozzles providing storage chambers for supplying resin to the cavities to compensate for shrinkage due to cooling of the resin material in the cavities after the valves are closed, means for retracting said ram after operation of said valves, and means rendered operative after said ram has retracted sufficiently to relieve pressure on the resin material in the machine between the ram and said valves to open all of said valves whereby to relieve pressure on the resin material in said nozzles before the dies are opened to eject molded articles from said cavities.

References Cited in the file of this patent

UNITED STATES PATENTS

| | | |
|---|---|---|
| 2,318,031 | Tucker | May 4, 1943 |
| 2,656,568 | Watkins et al. | Oct. 27, 1953 |
| 2,773,284 | Kelly | Dec. 11, 1956 |